April 20, 1954 — W. E. GLEASON ET AL — 2,675,987
TOGGLE-OPERATED DUMP VALVE FOR HYDRAULIC GOVERNING SYSTEMS
Filed Dec. 26, 1951
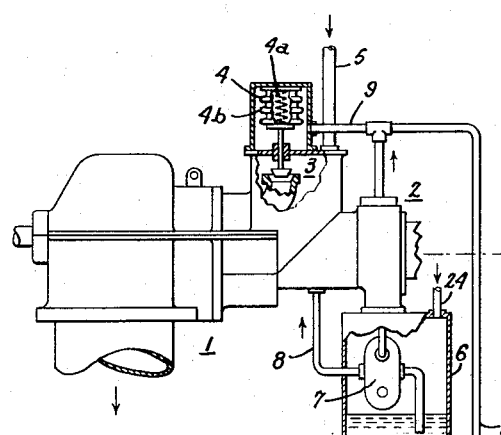
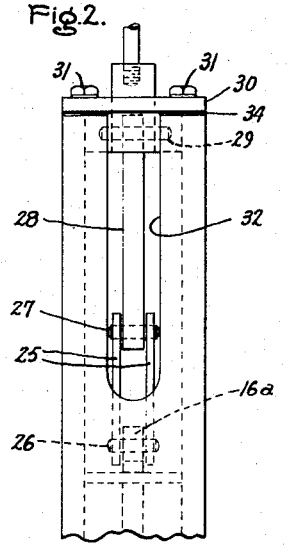
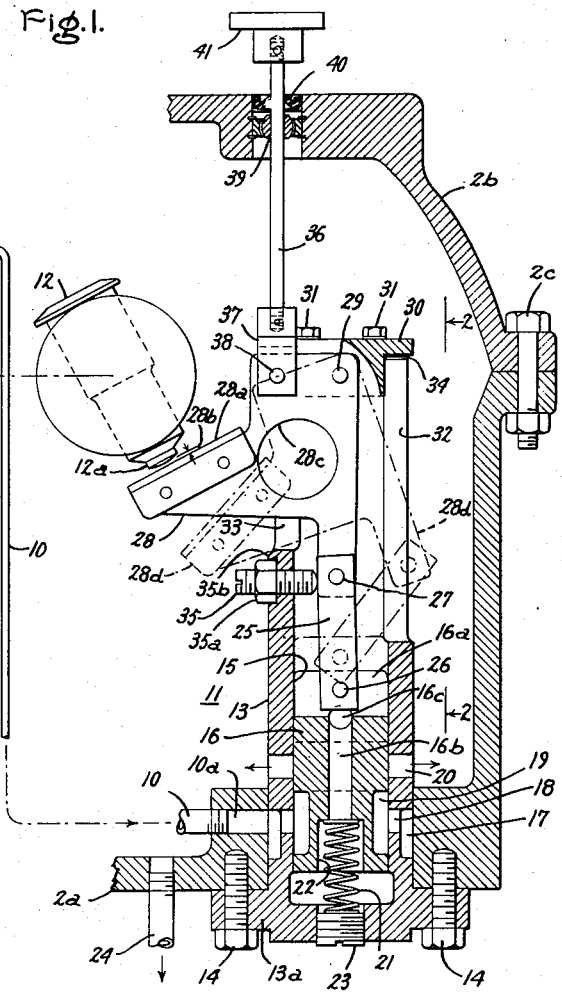
Inventors:
Wayne E. Gleason,
Everett C. Creamer
by Richard E. Hosley
Their Attorney.

Patented Apr. 20, 1954

2,675,987

UNITED STATES PATENT OFFICE 2,675,987

TOGGLE-OPERATED DUMP VALVE FOR HYDRAULIC GOVERNING SYSTEMS

Wayne E. Gleason, Winchendon, and Everett C. Creamer, Ashburnham, Mass., assignors to General Electric Company, a corporation of New York Application December 26, 1951, Serial No. 263,428

1 Claim. (Cl. 251—74)

This invention relates to hydraulic governing systems as used in turbine-type prime movers, particularly to an improved dump valve for shutting down the turbine when tripped by the emergency overspeed governor.

A common type of hydraulic governor for steam turbines and the like comprises a hydraulic supply pump driven by the turbine and supplying operating liquid to variously arranged hydraulic pilot valve means which modulate the flow of liquid to a turbine throttle valve operating cylinder. This throttle valve operator may take the form of a single-acting hydraulic motor biased to closed position by the steam inlet pressure and by a mechanical spring, the hydraulic operating liquid from the governor opening the throttle valve against the bias of the spring and steam pressure. Because such hydraulic governors connot be made 100% safe, it is customary to provide a secondary emergency overspeed governor of a simple, foolproof, mechanical type arranged to trip a dump valve which quickly permits operating liquid to drain from the throttle valve operating cylinder to effect closing of the steam valve.

The arrangements used previously for the hydraulic dump valve had the disadvantage that if they were designed to effect quick filling of the throttle valve motor, then the rate at which the motor drained was slow, and vice versa. Also, certain of the prior art devices employed trip valves having comparatively delicate knife-edge bearing surfaces in order to obtain the sensitive action required of the overspeed governor. The resulting structure was sufficiently delicate as to have poor shock resistance, for instance, when used on a turbine installed in a naval ship subject to severe shock forces during battle.

Accordingly, the object of the present invention is to provide an improved hydraulic dump valve for the emergency overspeed governing system of a turbine type prime mover, which will effect both quick filling and quick emptying of the turbine throttle operating cylinder, while being mechanically rugged, having no knife-edge bearings, and with excellent shock resistance.

Other objects and advantages will become apparent from the following description taken in connection with the accompanying drawings, in which Fig. 1 is a schematic view showing very diagrammatically a steam turbine having a hydraulic governing system with the improved trip valve incorporating the invention shown to an enlarged scale, and Fig. 2 is a transverse section of a detail of the trip valve, taken in the direction 2—2 in Fig. 1.

Generally, the improved hydraulic trip valve to which this invention relates comprises a reciprocable pilot valve plunger held in closed position against the bias of a comparatively light spring by an over-center toggle arrangement, arranged to be tripped by the emergency overspeed governor so as to permit the spring to quickly bias the pilot valve plunger to the other extreme of its range of movement, in which position the hydraulic throttle actuating motor is permitted to drain rapidly.

Referring now more particularly to Fig. 1, the trip valve is shown as applied to the governing system for a turbine 1, having suitable hydraulic governing mechanism indicated generally at 2, and a turbine throttle valve 3 adapted to be opened by a single acting hydraulic motor 4 against the bias of motive fluid admitted through inlet conduit 5 and the bias of a spring. For purpose of simplicity in illustration, the motor 4 is shown as comprising a flexible bellows 4b connected to position the throttle valve 3, hydraulic operating liquid being supplied to the outside of bellows 4b in order to move the throttle valve in the opening direction against the bias of a spring 4a.

The details of the governor 2 are not necessary to an understanding of the present invention, but it may be noted that the turbine oil tank 6 contains a positive displacement pump 7 connected by suitable gearing so as to be driven from the turbine shaft. Hydraulic operating liquid under pressure is supplied by conduit 8 to the governor 2, whence the throttle valve motor 4 receives its operating liquid by conduit 9. In the event of an emergency overspeed condition, operating liquid is quickly drained from the motor 4 by way of a conduit 10. This invention particularly relates to the improved hydraulic dump valve for effecting flow through drain conduit 10, this improved valve being shown to an enlarged scale at 11.

The emergency overspeed governor is indicated at 12 as being of the well-known "bolt" type, having an unbalanced plunger disposed in a transverse bore through the turbine shaft and arranged to move outwardly so as to strike a "trip finger" when rotor speed rises to a preselected value. For purposes of illustrating the present invention, it need only be noted that the projecting end portion 12a of the emergency governor moves radially outward upon attainment of a preselected speed.

The hydraulic trip valve 11 is shown in Fig. 1 as being disposed through an opening in the bottom wall 2a of the hydraulic governor casing. For convenience in access to the governor, this casing is formed with a separable upper portion 2b secured by suitable threaded fastenings 2c.

The trip valve proper comprises a generally cylindrical housing 13 having at the lower end thereof a flange 13a secured by threaded fastenings 14 to the housing wall 2a. The lower half of valve housing 13 defines a longitudinal bore 15 containing a longitudinally slidable flow control plunger member 16. The drain conduit 10 communicates with port 10a in housing 2a and with an annular groove 17 formed in the outer circumference of cylindrical housing 13. A plurality of radially drilled holes 18 communicate between annular groove 17 and another annular groove 19 formed in the outer surface of plunger 16. It will be apparent from Fig. 1 that with the plunger 16 in its lowermost position, as shown, flow of hydraulic operating liquid through conduit 10 is prevented. However, when plunger 16 is permitted to move upwardly, the annular groove 19 establishes communication between the inlet ports 18 and a second set of circumferentially spaced drain ports 20 in housing 13. Plunger 16 is biased upwardly toward the drain position by a coil spring 21 disposed in an axial recess 22 in the adjacent end of plunger 16. The other end of spring 21 abuts against a threaded plug 23 in the end of valve body 13. It will be obvious that access may be readily had to spring 21 for inspection or replacement by merely removing the plug 23. Liquid draining from the ports 20 is returned to the oil tank 6 by a drain conduit 24.

The present invention particularly resides in the toggle arrangement for holding the flow control plunger 16 in normal operating position against the bias of spring 21. This comprises first link means 25 connected by a pivot 26 to the upper end of plunger 16, and by pivot 27 to one arm of the trip finger 28. The trip finger is pivoted at 29 and has a second arm carrying a "striker plate" 28a, which is adapted to be engaged by the bolt of the emergency governor and ordinarily defines therewith a clearance space identified 28b in Fig. 1. Trip finger 28 may be lightened by a large central circular cutout 28c.

The stationary trip finger pivot 29 passes transversely through a bushing or plug member 30, having a circumferential flange portion secured by threaded fastenings 31 to the upper end of the cylindrical member 13. Actually, the upper half of cylinder 13 is cut away to form a longitudinal slot 32 at the rearward side thereof, being also cut away as indicated at 33 at the forward side thereof in order to permit the respective portions of the toggle mechanism to have the necessary clearance in moving from the normal operating condition to the tripped condition, as described below. It will be understood from Fig. 1 that, by reason of the substantial cutout portions 32, 33, the upper half of the cylinder 13 is actually a pair of transversely spaced, axially projecting bracket members adapted to support the end plug or bridge member 30.

It is also to be noted that one or more shims of suitable thickness are interposed between the plug 30 and the abutting end portions of cylinder 13, as indicated at 34. The function of these shims is to provide an easy method of adjusting the clearance space 28b between the striker plate 28a and the emergency governor bolt 12a. It will be apparent that increasing the thickness of the shim 34 will decrease the size of the clearance space 28b. It will also be apparent that ready access is had to the trip mechanism by simply removing the upper casing half 2b, after which the entire trip finger-toggle-plunger assembly may be removed from the housing 13 by simply removing the threaded fastenings 31 and pulling the plug member 30 upwardly, so that the toggle link assembly and plunger are removed from the bore of cylinder 13. Thus, all the working parts of the trip valve are readily removed for inspection and servicing.

The arrangement of the link means 25 is shown better in the detail view shown in Fig. 2. Here it will be seen that the upper end of plunger 16 is cut away at diametrically opposite sides thereof to define a central upwardly-projecting "ear" 16a. The link 25 is actually a pair of spaced links disposed on either side of the ear 16a.

In order to prevent oil pressure building up in the end chamber occupied by spring 21, due to operating liquid leaking past the lower end portion of plunger 16, an axial passage is provided through the plunger 16, as shown at 16b. In order that this drain passage may discharge freely through the upper end of plunger 16, there may be drilled a transverse hole shown at 16c in Fig. 1. This hole 16c is, of course, drilled before the side portions of the plunger are removed to form the ear 16a. By comparison of Figs. 1 and 2, it will be understood that the lower half of this transverse hole 16c communicates with the longitudinal drain passage 16b, while the upper half of hole 16c extends into the lower portion of the ear 16a, to permit escape of the leakage fluid. Thus, any leakage past the plunger 16 is passed freely to drain without any possibility of interfering with the longitudinal motion of plunger 16.

The "tripped" condition of the trip finger 28 and its toggle-actuating mechanism is indicated in dotted lines at 28d in Fig. 1. It will be seen that, when tripped, the links 25 and associated portion of trip finger 28 project rearwardly through the slot 32 in the housing cylinder 13.

The "over-center" condition of this toggle linkage when in the normal operating condition is represented in full lines in Fig. 1, this position being determined by the adjustment of a threaded stop member 35. In assembling the trip valve, the plunger 16, links 25, trip finger 28, and plug member 30 are connected by their respective pivots, and the whole assembly slid axially into the bore 15, with the trip finger projecting through the cutouts 32, 33, as shown in Fig. 1. After the threaded fastenings 31 are secured, the adjusting screw 35 is turned until the members 25, 28 will just latch in the over-center position shown. Then the set screw 35 is backed off two complete turns, the lock-nut 35a tightened, and the adjacent portion of housing 13 peened over against the nut 35a, as shown at 35b. The adjustment of stop 35 is thereby fixed and will ordinarily remain unchanged for the life of the equipment.

In order to permit manually resetting the trip finger to the normal operating condition from the exterior of the casing, as well as providing means for manually tripping the device if that should be desirable, a manual trip rod 36 is provided. The lower end of rod 36 is threadedly received in a bifurcated fitting 37 connected by pivot 38 to an upper projecting portion of the trip finger 28. The upper end of trip rod 36 projects upwardly through housing 2b, being supported therein by a spherical bearing 39 protected by an oil seal 40. It will be obvious to those skilled in the art that the spherical bearing 39 and seal 40 are designed to permit freely the angularity which must occur in the rod 36 when the trip finger 38 moves from its normal to tripped position. The upper end of rod 36 carries an operating handle 41. It will be apparent that the toggle mechanism is set by pulling upwardly on the handle 41; while the toggle is tripped by pushing handle 41 down.

The method of operation of this improved trip valve will be apparent from the above description of the structure. After the trip valve is manually reset to normal operating condition shown in Fig. 1 by pulling upwardly on the handle 41, the turbine governing mechanism may be operated to bring the turbine up to speed. In the event of an emergency overspeed condition, or if the manual handle 41 should be depressed, the trip finger 28 is caused to rotate counterclockwise about pivot 29 so that the intermediate pivot 27 crosses the axis of the plunger 16, whereupon spring 21 quickly biases the plunger upwardly to the tripped condition shown in dotted lines in Fig. 1. This permits the operating liquid from throttle valve motor 4 to drain through conduit 10 through the trip valve as described above, and back to the oil tank by way of conduit 24.

It will be seen that the invention provides a trip valve of simple and extremely reliable mechanical construction, having no delicate parts such as knife-edge bearings, all moving parts being readily accessible for inspection and repair. Because of the hydraulically balanced arrangement of the plunger 16, there are no large forces to be overcome by the spring 21, so that the spring and all the moving parts may be of comparatively light construction, thus reducing the inertia to effect quick operation when the valve is tripped. Because of the generously proportioned flow passage through the valve, there is substantially no restriction to the drain of liquid therethrough, with the result that hydraulic motor 4 may be very quickly moved to the "valve-closed" position when the trip valve is actuated. Because of the simplicity and sturdiness of the structure, it has good resistance to shock when used in marine turbines on military ships. The shim adjusting means, to which access is readily had by removal of the upper casing half 2b, permits ready alteration in the "striking clearance" between the emergency governor bolt 12a and the striker plate 28a.

While only one specific embodiment of the invention has been described in detail herein, it will be obvious to those skilled in the art that many minor alterations and substitutions of mechanical equivalents might be made. For instance, other equivalent means might be substituted for the manual reset rod 36. Also, the bracket means for supporting the plug member 30 could be fabricated separately from the valve housing 13 and suitably bolted or otherwise secured thereto. Likewise, the adjustable abutment 35 for determining the limiting over-center position of the toggle might take other forms. It is, of course, desired to cover by the appended claim all such changes as fall within the true spirit and scope of the invention.

What I claim as new and desire to secure by Letters Patent of the United States is:

A hydraulic dump valve comprising a housing defining a bore containing a linearly reciprocable flow control member having a normal operating position and a tripped position, means for normally holding the flow control member in one extreme position and for quickly moving it to the tripped position including spring means biasing the flow control member from the normal operating to the tripped position, a pair of transversely spaced bracket members projecting axially from one end of the housing, a bridge member removably secured to the remote ends of said bracket members, a generally triangular trip finger member disposed between said bracket members and having a first portion adapted to be engaged by an actuating member defining a preselected clearance space with the trip finger, a second portion remote from the flow control member, transverse pivot means connecting said second trip finger portion to said bridge member at a plane through the axis of the flow control member, and a third portion adjacent and spaced axially from the flow control member, toggle link means with opposite end portions pivoted to said third trip finger portion and to the flow control member respectively, shim means interposed between said bridge member and the abutting ends of said bracket members to effect limited axial adjustment of the trip finger member for determining said preselected clearance space, and adjustable stop means for establishing the over-center position of the toggle link pivot connecting the third trip finger portion with said link means when the finger is rotated about said transverse pivot means, whereby the toggle linkage is biased into contact with said stop by the spring and the flow control member may be tripped by contact of the actuating member with said first portion of the trip finger.

References Cited in the file of this patent
UNITED STATES PATENTS

| Number | Name | Date |
|---|---|---|
| 2,246,379 | Muir | June 17, 1941 |